United States Patent
Peters

(10) Patent No.: US 7,234,186 B2
(45) Date of Patent: Jun. 26, 2007

(54) RIM CLEANING APPARATUS

(76) Inventor: Eugene A. Peters, 603 N. Franklin St., Greensburg, IN (US) 47240

( * ) Notice: Subject to any disclaimer, the term of this patent is extended or adjusted under 35 U.S.C. 154(b) by 390 days.

(21) Appl. No.: 10/947,670

(22) Filed: Sep. 23, 2004

(65) Prior Publication Data
US 2005/0071937 A1     Apr. 7, 2005

Related U.S. Application Data

(60) Provisional application No. 60/508,817, filed on Oct. 6, 2003.

(51) Int. Cl.
*A46B 13/02* (2006.01)
*B60S 3/06* (2006.01)
(52) U.S. Cl. .............. 15/23; 15/21.1; 15/53.4; 15/88.4
(58) Field of Classification Search ............. 15/21.1, 15/23, 53.4, 88.4
See application file for complete search history.

(56) References Cited

U.S. PATENT DOCUMENTS

| | | | | | |
|---|---|---|---|---|---|
| 2,807,038 | A | * | 9/1957 | Henry ................... | 15/88.3 |
| 2,915,766 | A | * | 12/1959 | Peterson ................ | 15/21.1 |
| 4,527,300 | A | * | 7/1985 | Kunde et al. .......... | 15/88.2 |
| 4,532,665 | A | * | 8/1985 | Evans et al. .......... | 15/88.3 |
| 5,161,281 | A | * | 11/1992 | Hanen ................... | 15/88.3 |
| 5,964,002 | A | * | 10/1999 | Schaal ................... | 15/21.1 |

FOREIGN PATENT DOCUMENTS

WO     WO91/01819     * 2/1991

* cited by examiner

Primary Examiner—Randall Chin
(74) Attorney, Agent, or Firm—Taylor & Aust, P.C.

(57) ABSTRACT

Apparatus for cleaning the rim of a wheel. The apparatus comprises a housing journaling a driveshaft, driven by an electric motor and mounting a pair of wire brushes configured to contact the wheel rim. Guides on the housing cause the axis of the drive shaft to be parallel to the wheel axis. In use, the housing pivots to follow the wheel rim while the electric motor remains in the same orientation. A brake mechanism between the housing and electric motor prevents rotation of the housing when the guides are not engaged with the wheel rim.

16 Claims, 3 Drawing Sheets

RIM CLEANING APPARATUS

REFERENCE TO RELATED APPLICATIONS

This application claims the benefit of U.S. Provisional Patent Application Ser. No. 60/508,817 filed Oct. 6, 2003, which is hereby incorporated by reference in its entirety.

BACKGROUND OF THE INVENTION

The invention relates to a cleaner and, more specifically, a device for cleaning the rims of automotive wheels.

The automotive field has experienced a significant increase in the percentage of wheels made out of cast aluminum or other lightweight alloys. These wheels exhibit increased durability and significantly enhanced appearance. However, these benefits come at a price. The aluminum wheels are significantly more expensive that previous stamped steel wheels and they have a softer surface. This has an impact when tires are being replaced and it is necessary to clean the new tires prior to installing a replacement tire. Very often, the rubber from the replaced tires and/or corrosion accumulates on the rim of the wheel. Most current tires are tubeless, making it important that any installation of new tires is with a smooth interface between the rubber and the wheel. In the past, old rubber and any corrosion or oxidation was removed either by an operator using a wire brush or electric or pneumatic rotary grinder. Because it was essentially a hand operation, this process was subject to significant operator variability making it very possible for an operator to remove too much material and result in a leak path for air from the interior of the tire.

Such a process is applicable to many types of vehicle wheels including commercial vehicles, passenger cars and motorcycles. The widespread need for such a cleaning device makes it imperative that cleaning be done in a fashion that minimizes damage and disturbance to the wheel and provides easy operator manipulation.

SUMMARY

In one aspect of the invention, a wheel rim cleaning apparatus comprises a housing and a shaft journaled in the housing, the shaft being connectable to a rotary output device. An annular cleaning element is fixed to the shaft and has at least a portion thereof configured to contact the rim. Guides are provided on the housing for contacting the rim of the wheel so that when the annular cleaning element contacts the rim, the housing is engaged with the rim so that the shaft is oriented parallel to the axis of the wheel, whereby the rotary output device can assume uniform orientation relative to the wheel as the cleaning apparatus traverses the rim.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
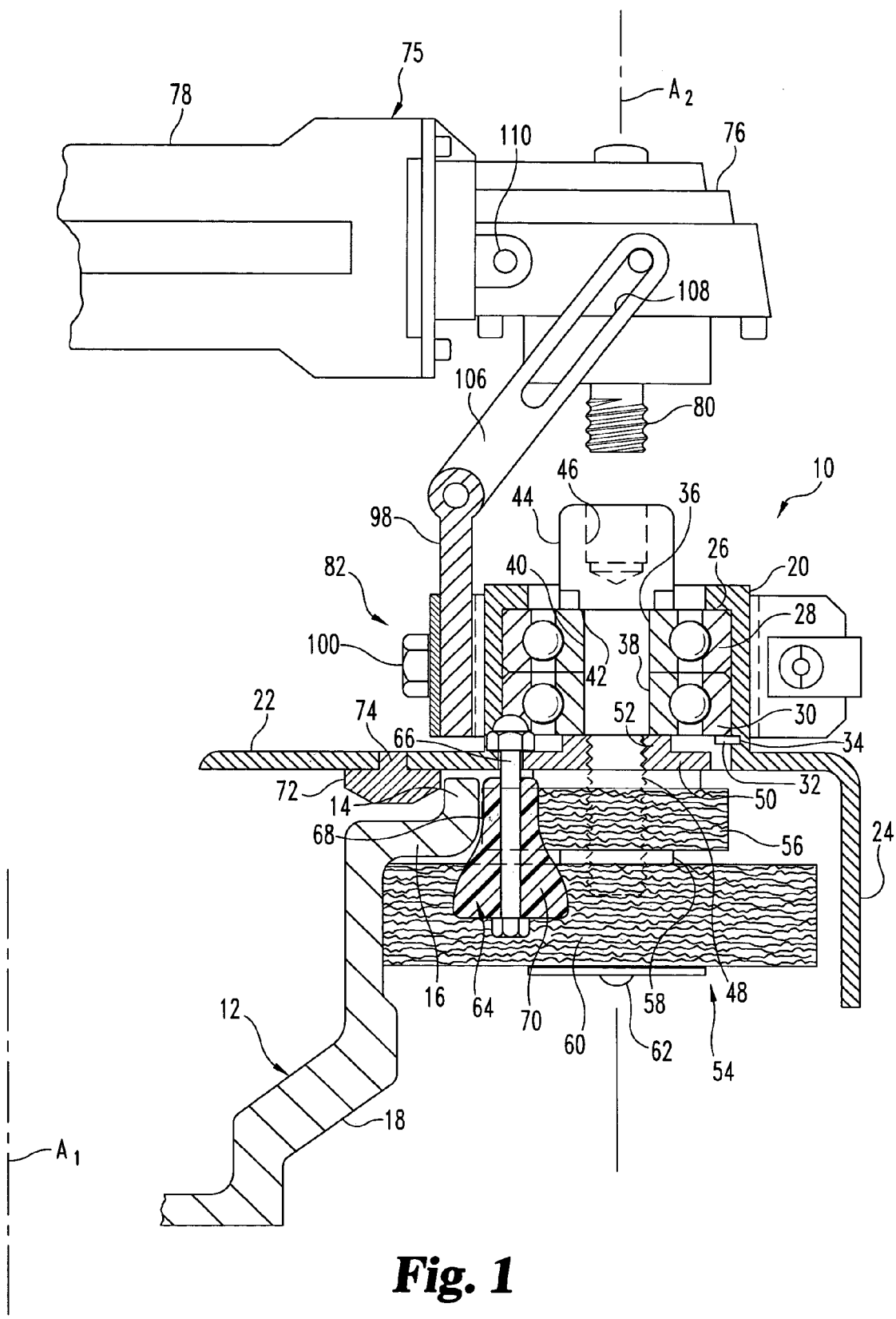
FIG. 1 is a side view partially sectioned of a rim-cleaning device along with a rim of a wheel to be cleaned and a rotary output device connectable with the rim cleaning device.
Figure 2:
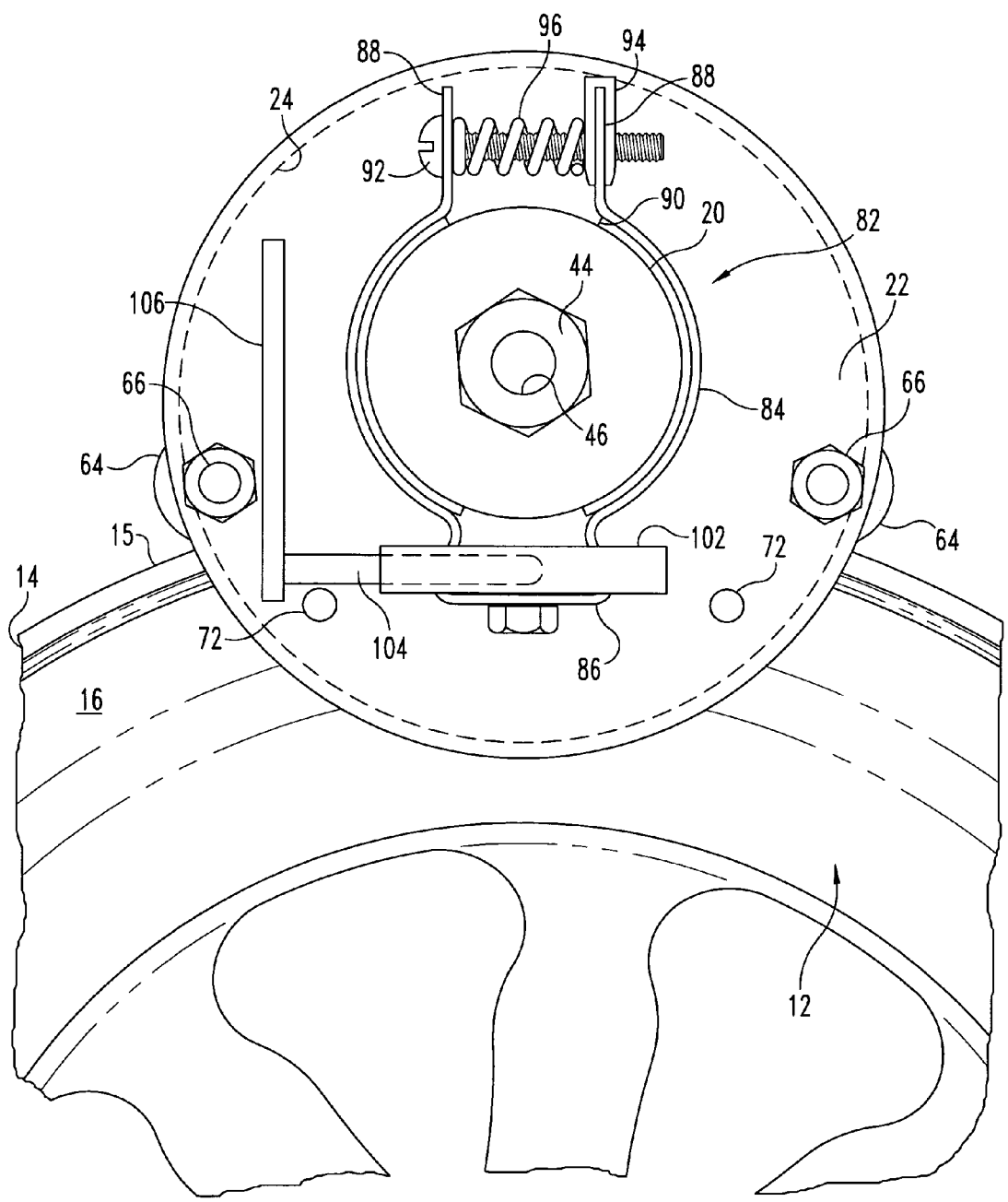
FIG. 2 is a plan view of FIG. 1 with the rotary output device removed.

FIG. 1 and FIG. 2 show a wheel rim cleaning apparatus 10 together with a wheel 12. Wheel 12, in typical fashion, comprises an annular rim 14 having an outside diameter 15 extending parallel to, and concentric with, an axis $A_1$, herein shown not in its true location for illustrative purposes. Rim 14 connects with a radially extending annular section 16, integral with hub section 18 of the wheel 12. As is typical with wheel 12, the rim 14 will have a complimentary rim below the drawing in FIG. 1, not shown to simplify an understanding of the present invention. A pneumatic tire, generally without a tube, is placed so that its inner bead abuts rim 14 and annular section 16 and the second bead (not shown) abuts the complimentary rim referred to above. This is the joint over which a positive seal is maintained to ensure that tire pressure remains at an elevated level during operation of a vehicle. As stated previously, when tires wear out and need to be replaced, the process of removal leaves behind adhered rubber particles and/or corrosion. In order for the replacement tire to have an effective seal, it is necessary to clean the rim of corrosion and left behind rubber particles. The wheel rim cleaner 10, in accordance with the present invention, accomplishes this purpose.

As shown in FIG. 1, wheel cleaner 10 comprises a cylindrical housing 20 extending to an integral circular plate 22 having an axially extending section 24 embracing a portion of its periphery. The cylindrical portion 20 of the housing has a shoulder 26 which forms a stop for ball bearing assembly 28 abutting and stacked with another ball bearing assembly 30. The bearing assemblies 28 and 30 are held within the cylindrical portion 20 by a C clip 32 received in an internally facing groove 34 and abutting the outer race of bearing assembly 30. Bearing assemblies 28 and 30 have an inner diameter 36 and 38 respectively, which receives a drive shaft 40 having a shoulder 42 abutting one end of the inner diameter 36 of bearing assembly 28. Extending from shoulder 42 is a hex nut 44 with an internally threaded recess 46. The opposite end of shaft 40 is threaded at 48 and a spanner nut 50 is threaded onto the threaded portion 48 of shaft 40 so that a reduced diameter shoulder 52 of spanner nut 50 abuts the inner race of bearing assembly 30 where it joins the internal diameter 38. Thus, the shaft 40 and bearing assemblies 28 and 30 are positively held within the cylindrical portion 20 of the housing. The threaded portion 48 of shaft 40 receives a pair of cleaning elements 54 generally designated by reference character 54.

The cleaning elements 54 are annular and configured to fully contact the outer diameter 15 of rim 14 and the adjacent axial section 16 for cleaning purposes. The cleaning elements 54 are annular so that cleaning can be affected by rotation of the shaft assembly 40. A variety of cleaning materials may be utilized for this purpose. One such material would be a material known as Scotch-Brite™, a product of 3-M, Saint Paul, Minn. Another product and one which will be utilized in the following description is an annular wire brush. A first wire brush 56 having a diameter such that it contacts the outer diameter of rim 14 is positioned over threaded portion 48 of shaft 40. As is appropriate, a spacer 58 is then placed over threaded portion 48 and abuts a larger diameter annular wire brush 60 designed to contact the side edge of section 16 and a portion of the bottom of the hub section 18. Finally, a retaining nut 62 holds the wire brushes 56 and 60 on the shaft. Wire brush 60 is preferably a beveled wire brush so that the wires more effectively clean the side of annular section 16.

The wire brushes are guided for accurate movement around the rim 14 by pairs of guides. As shown in both FIG. 1 and FIG. 2, there is a first pair of guides in the form of rollers 64 journaled over screws 66 appropriately fixed to wall 22 of the housing. Rollers 64 have a first section 68 adapted to engage the outer diameter 15 of rim 14 and an expanded diameter section 70 curved to embrace the corner of the rim 14 and to hold the cleaning apparatus 10 in place. The rollers 64 cooperate with buttons 72 secured in holes 74 in wall 22 and positioned to abut the inner diameter of rim 14. As herein illustrated, the roller 64 and buttons 72 are made from a nylon material owing to its inherent lubricity and resistance to solvents. It should be apparent that other materials may be used with equivalent results.

The arrangement of the rollers 64 and buttons 72 position the cleaning apparatus on the rim 14 so that the axis $A_2$ of the cleaning apparatus is parallel to the axis $A_1$ of the wheel 12. The shaft 40 is adapted to be driven by a rotary output power tool 75. As is typical in the industry, power tool 75 is intended to be used for a variety of purposes including grinding, cutting, etc. For this purpose power tool 75 has an output transmission 76 which receives a rotary input from a power section 78 and turns it at right angles to produce a rotary output at threaded output shaft 80. Output shaft 80 is adapted to be threaded into internal threads 46 of the head of drive shaft 40. The hex head 44 enables the connection to be tightened with a wrench. As herein illustrated, the power section 78 is an electric motor. It should be apparent, however, that the invention may be implemented using a pneumatic or hydraulic drive with equal results.

Figure 3:
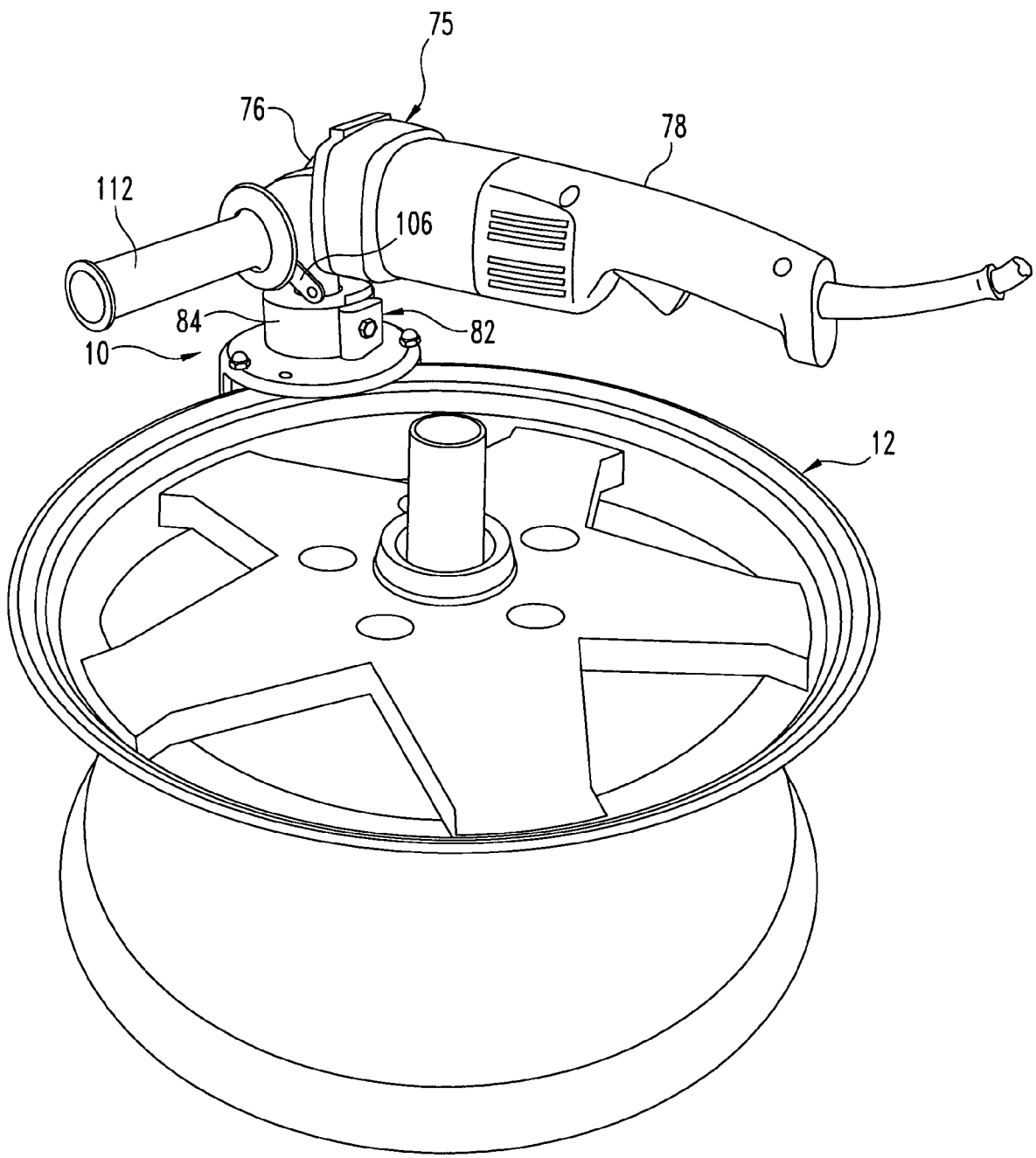
FIG. 3 is a perspective view showing application of the cleaning device to a wheel rim to be cleaned.

When the output shaft 80 is engaged with drive shafts 40, the cleaning wheels 56 and 60 can be used to clean the rim 14. As the cleaning unit 10 traverses the circumference of wheel 12, the fact that the drive shaft 80 is parallel to the axis of the wheel 12 ensures that an operator can hold the power tool 75 in a given orientation to minimize operator reorientation and increase productivity. In addition, there is less likelihood that an electric cord or pneumatic line extending to the power section 78 of the power tool 75 will be tangled. This is illustrated particularly in FIG. 3 showing the cleaner 10 and power tool 75 in place on a wheel rim 12. As the operator traverses the wheel, the housing 10 pivots around wheel 12 while the handle of power tool 75 maintains its same orientation relative to the ground and to the wheel, which is stationary. This ensures that if the wheel is being cleaned on a tire changing apparatus, that the operator can stand to one side and easily engage and clean the wheel without having to walk around the periphery of the wheel or to have some mechanism necessary to rotate the wheel relative to the cleaning element 10.

When the wire brushes 56 and 60 rotate to clean the wheel 12, they urge cleaning apparatus 10 to walk around wheel 12 in a given direction. If an operator manipulates the cleaning apparatus 10 to traverse the wheel 12 in that direction, the wire brushes 56 and 60 assist in the movement of the apparatus 10. If it is desired to achieve a more aggressive cleaning, the operator can move the cleaning apparatus in the opposite direction.

In order to ensure that the housing 20 and associated elements do not rotate if the power tool 75 is operated when the cleaning unit 10 is not in place on the rim, a brake mechanism 82 is provided. Brake mechanism 82 comprises an integral clamp 84 having a base 86 and a pair of free end tabs 88. The curved section 84 of brake mechanism 82 has a material 90 especially suited for contacting the cylindrical portion 20 of the housing to provide appropriate frictional engagement. Although many other materials can be used, the loop component, also known as the "fuzzy" or "pile" of Velcro® brand fasteners gives an appropriate uniform contact and level of frictional engagement. The tabs 88 receive a screw 92 threaded into a clip 94. The ends 88 are adjusted to a predetermined dimension and maintained at that dimension by spring 96.

The spacing of tabs 88 is selected so that the frictional interengagement with the cylindrical portion 20 of the housing that when the cleaning apparatus 10 is not engaged with the rim of the wheel 12, and the power tool 75 operated for any reason, the brake will keep the housing from spinning. However, the frictional interengagement is set so that the operator is still permitted to maintain the same orientation as the operator cleans the rim of the wheel 12 as shown in FIG. 3.

The brake mechanism 82 is conveniently fixed to the power tool 75 by means of a bracket 98 secured to the base 86 of clamp 82 by a screw 100. Bracket 98 has an upper tubular section 102 positioned to receive a shaft 104 connected to, and integral with, an arm 106. Arm 106 has a slot 108, which is adapted to be placed in line with a threaded hole 110 on power tool 75. Threaded hole 110 receives a handle 112 (shown in FIG. 3) to provide an operator handhold. The screw for handle 112 passes through slot 108 to hold it in position. Because arm 106 is pivotal and slideable laterally relative to bracket 98, a variety of positions and over-all dimensions can be accommodated.

The cleaning apparatus 10 enables the use of simple commercially available hand tools to provide highly effective and precise cleaning of the rims of the wheel 12. Because the cleaning apparatus is pivotal relative to the power tool 75, an operator can easily use the device to traverse a stationary wheel without having to change position. Furthermore, the brake assembly 82 provides a mechanism for minimizing if not eliminating any spinning that would occur if the power tool 75 is operated when the cleaning unit 10 is no longer engaged with the wheel.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. Apparatus for cleaning the rim of a wheel, said apparatus comprising:
    a housing,
    a handheld device providing a rotary output,
    a shaft journaled in said housing and being connectable to said handheld rotary output device,
    an annular cleaning element fixed to said shaft and having at least a portion thereof configured to contact the rim,
    guides on said housing for contacting the rim of the wheel so that when said annular cleaning element contacts the rim, and said housing is engaged with the rim, said shaft is oriented parallel to the axis of said wheel, whereby the hand-held rotary output device can assume the same orientation relative to said wheel while said housing pivots about its axis as said cleaning apparatus traverses the rim, said housing at least partially enclosing said cleaning element for containing material cleaned from the rim; and comprising a wall having at least a portion of its circumference circular, said wall being perpendicular to said shaft and a section extending axially from the circular circumference of said wall, said cleaning element being positioned adjacent to said wall and bounded by said axially extending section.

2. Apparatus as claimed in claim 1 wherein said guides are supported on said wall for contacting opposite sides of said rim.

3. Apparatus as claimed in claim 2 wherein said rim has a radially outer edge and radially inner edge and said guides comprise:
   a first pair of guides in the form of rollers journaled to said wall, said nylon rollers having an expanded diameter away from said wall for extending over the radially outer edge of said rim,
   a second pair of guides positioned radially inward of said rollers for guiding along the radially inner edge of said rim.

4. Apparatus as claimed in claim 3 wherein said rollers are journaled in said wall by a central shaft journaling said guides in place.

5. Apparatus as claimed in claim 4 wherein said rollers are nylon.

6. Apparatus for cleaning the rim of a wheel, said apparatus comprising:
   a housing,
   a hand-held device providing a rotary output,
   a shaft journaled in said housing and being connectable to said hand-held rotary output device,
   an annular cleaning element fixed to said shaft and having at least a portion thereof configured to contact the rim,
   guides on said housing for contacting the rim of the wheel so that when said annular cleaning element contacts the rim, and said housing is engaged with the rim, said shaft is oriented parallel to the axis of said wheel, whereby the hand-held rotary output device can assume the same orientation relative to said wheel while said housing pivots about its axis as said cleaning apparatus traverses the rim, and
   a brake assembly fixable to the hand-held rotary output device and having sufficient frictional engagement with said housing to prevent rotation of said housing when said hand-held rotary output device is actuated without the guides engaging said rim.

7. Apparatus as claimed in claim 6 wherein said housing has a cylindrical portion between said cleaning element and said hand-held rotary device and said brake comprises:
   a band surrounding said cylindrical portion of said housing, said band being bifurcated and having a base and a free end,
   a device at the free end of said band for adjustably positioning said band in contact with the cylindrical portion of said housing to provide said frictional engagement, and
   a bracket connected to the base of said band, said bracket being connectable with said hand-held rotary device.

8. Apparatus as claimed in claim 7 wherein said hand-held rotary output device has a threaded hole receiving a handle through a threaded connection and wherein said bracket comprises a slotted arm adjustably positioned so that the handle is threaded to said hand-held rotary device through the slot in said arm.

9. Apparatus as claimed in claim 8 wherein said band has friction material for engaging said cylindrical portion of said housing.

10. Apparatus for cleaning the rim of a wheel, said apparatus comprising:
    a housing,
    a shaft journaled in said housing, and being connectable to a hand-held rotary output device,
    an annular cleaning element fixed to said shaft and having a portion thereof configured to contact the rim
    guides on said housing for contacting the rim of the wheel so that said annular cleaning element contacts the rim, said housing is engaged with the rim so that said axis of said shaft is oriented parallel to the axis of said wheel, said housing at least partially enclosing said cleaning element for containing material cleaned from the rim, and comprising a circular wall perpendicular to said shaft and adjacent said annular cleaning element and having a section extending axially from a portion of the circumference of said circular wall beyond said annular cleaning element, said guides being supported on said circular wall for contacting opposite sides of said rim.

11. Apparatus as claimed in claim 10 wherein said rim has a radially outer edge and radially inner edge and said guides comprise a first pair of guides in the form of rollers journaled to the circular wall, said rollers having an expanded diameter away from said wall for extending over and capturing the radially outer edge of said rim,
    a second pair of guides positioned radially inward of said rollers for guiding along and capturing the radially inner edge of said rim.

12. Apparatus as claimed in claim 11 wherein said rollers are journaled in said wall each by a central shaft extending from said wall.

13. Apparatus as claimed in claim 10 further comprising a brake assembly engaging said housing and fixable to the rotary output device, said brake assembly having sufficient frictional engagement with the housing to prevent rotation of said housing when the hand-held rotary output device is actuated without the guides engaging said rim.

14. Apparatus as claimed in claim 13 wherein said housing has a cylindrical portion extending from said circular plate on the side opposite wherein said cleaning element is positioned and said brake comprises:
    a band surrounding said cylindrical portion of said housing, said band being bifurcated and having a base and a free end,
    a device at the free end of said band for adjustably positioning said band in contact with the cylindrical portion of said housing to provide said frictional engagement, and
    a bracket connected to the base of said band, said bracket being connectable with said rotary output device.

15. Apparatus as claimed in claim 14 wherein said bracket comprises a slotted arm for adjustable connection with the rotary output device.

16. Apparatus as claimed in claim 10 wherein said cleaning element is a pair of wire brushes fixable on said shaft for engaging the rim, one of said wire brushes having a larger outside diameter than the other, the larger diameter wire brush being beveled and positioned to clean the back side of the wheel rim and the smaller diameter wire brush being adaptable to clean the outer edge of said rim.

* * * * *